United States Patent
Yan et al.

(10) Patent No.: US 11,528,673 B1
(45) Date of Patent: Dec. 13, 2022

(54) METHOD AND SYSTEM FOR ESTABLISHING ANCHORS IN AUGMENTED REALITY ENVIRONMENT

(71) Applicant: AMBIT MICROSYSTEMS (SHANGHAI) LTD., Shanghai (CN)

(72) Inventors: Yu-Hu Yan, New Taipei (TW); Chien-Sheng Wu, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 17/338,940

(22) Filed: Jun. 4, 2021

(30) Foreign Application Priority Data

May 31, 2021 (CN) .......................... 202110603549.X

(51) Int. Cl.
| | | |
|---|---|---|
| *G06T 19/00* | (2011.01) | |
| *H04W 56/00* | (2009.01) | |
| *H04W 76/15* | (2018.01) | |
| *G06F 3/01* | (2006.01) | |
| *G06V 20/20* | (2022.01) | |

(52) U.S. Cl.
CPC .......... *H04W 56/004* (2013.01); *G06F 3/012* (2013.01); *G06T 19/006* (2013.01); *G06V 20/20* (2022.01); *H04W 76/15* (2018.02)

(58) Field of Classification Search
CPC .... G06T 19/006; H04W 56/004; H04W 76/15
USPC ...................................................... 455/456.1
See application file for complete search history.

(56) References Cited

U.S. PATENT DOCUMENTS

| | | | |
|---|---|---|---|
| 2017/0367766 A1* | 12/2017 | Mahfouz | A61B 17/155 |
| 2019/0075438 A1* | 3/2019 | Kuo | H04W 4/70 |
| 2020/0019231 A1* | 1/2020 | Chung | G06F 1/1698 |
| 2020/0351537 A1* | 11/2020 | Browy | H04N 21/41407 |

FOREIGN PATENT DOCUMENTS

CN          112236951 A        1/2021

\* cited by examiner

*Primary Examiner* — Thomas J Lett
(74) *Attorney, Agent, or Firm* — ScienBiziP, P.C.

(57) ABSTRACT

A system and method for establishing anchors in an augmented reality environment activates an anchor device to continuously transmit a first spatial information packet and a second spatial information packet, the first and second packets being respectively sent through a first communication technology and a second communication technology. The first spatial information packet and the second spatial information contain an identification (ID) and an angle information of the anchor device. An augmented reality (AR) device receives the first spatial information packet and the second spatial information packet. The AR device further includes a processing unit. A spatial relationship between the AR device and the anchor device is obtained through the processing unit according to the first spatial information packet and the second spatial information packet. The spatial relationship includes a position of the anchor device relative to the AR device, and the horizontal and vertical distances therebetween.

8 Claims, 7 Drawing Sheets

METHOD AND SYSTEM FOR ESTABLISHING ANCHORS IN AUGMENTED REALITY ENVIRONMENT

FIELD

The disclosure relates to augmented reality technology, in particular to a method and a system for establishing an anchor in augmented reality environment.

BACKGROUND

It is necessary to scan physical anchors to obtain the characteristics of the anchors to build the spatial model of the anchors. The virtual objects are bound with the anchors after the anchors are established. Thus the virtual object can be fully presented in the augmented reality environment. However, there are many factors that cause errors when the physical anchors are scanned, such as angles, directions, light, surrounding environments, distances, and algorithms.

BRIEF DESCRIPTION OF THE DRAWINGS

Implementations of the present technology will now be described, by way of embodiment, with reference to the attached figures, wherein.

DETAILED DESCRIPTION

Figure 1:
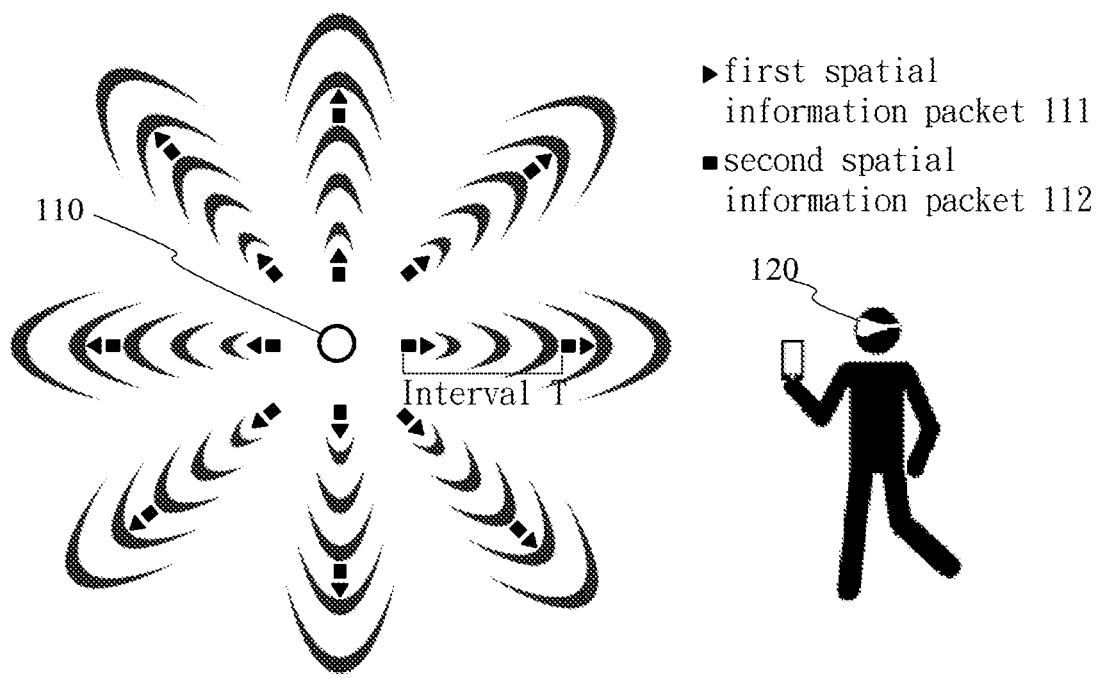
FIG. 1 is a system architecture diagram according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" embodiment in this disclosure are not necessarily to the same embodiment, and such references mean "at least one."

FIG. 1 is a system block diagram of a system according to an embodiment of the disclosure. The system is used for establishing an anchor in augmented reality (AR) environment includes an anchor device 110 and an AR device 120. As shown in FIG. 1, the anchor device 110 transmits a first spatial information packet 111 and a second spatial information device 112 at time interval T. The anchor device 110 further comprises transmitters (not shown in FIG. 1). The anchor device 110 can includes at least two transmitters for transmitting two kinds of communication technology. The anchor device 110 transmits the first spatial information packet 111 through a first communication technology and transmits the second spatial information packet 112 through the second communication technology. The first spatial information packet 111 and the second spatial information packet include an identification (ID) of the anchor device 110 and information as to angle of the transmitters in relation to the AR device 120. The first communication technology and the second communication technology comprise radio waves and ultrasonic, infrared, and laser transmissions.

In another embodiment, each of the transmitters includes two sub-transmitters. One of the sub-transmitters transmits the first spatial information packet through the first communication technology and the other one transmits the second spatial information packet through the second communication technology.

The AR device 120 receives the first spatial information packet 111 and the second spatial information packet 112. The AR device 120 comprises a processing unit (not shown in FIG. 1). The processing unit obtains a spatial relationship between the AR device 120 and the anchor device 110 according to the first spatial information packet 111 and the second spatial information packet 112. The spatial relationship includes an orientation, a horizontal distance, and a vertical height of the anchor device 110 relative to the AR device 120.

Figure 2:
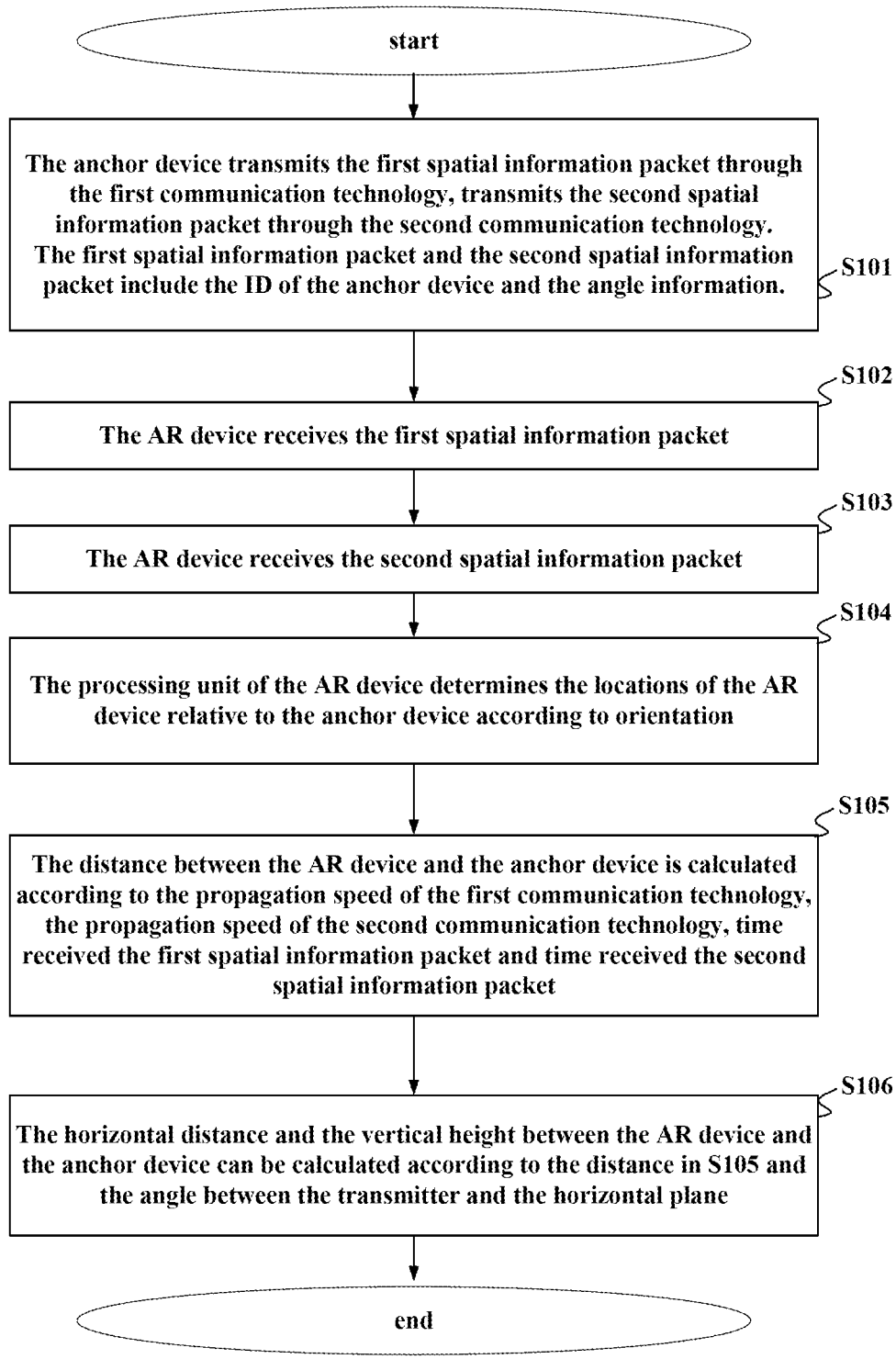
FIG. 2 is a flowchart of method to establish anchor devices in an augmented reality environment according to an embodiment of the disclosure.

FIG. 2 is a flowchart of a method according to an embodiment of the disclosure.

As shown in FIG. 2, in step S101, the anchor device transmits the first spatial information packet through the first communication technology and transmits the second spatial information packet through the second communication technology. The first spatial information packet and the second spatial information packet include the ID of the anchor device and the angle information. The angle information comprises an orientation of the transmitter and an angle with reference to horizontal plane of the transmitter.

In step S102, the AR device receives the first spatial information packet from the anchor device through the first communication technology.

In step S103, the AR device receives the second spatial information packet from the anchor device through the second communication technology.

In step S104, the processing unit obtains the spatial relationship between the AR device and the anchor device according to the first spatial information packet and the second spatial information packet. The spatial relationship includes the orientation, the horizontal distance, and the vertical height between the two devices. The processing unit determines the location of the AR device relative to the anchor device according to orientation.

In step S105, the distance between the AR device and the anchor device is calculated by the AR device. A first propagation speed of the first communication technology and a second propagation speed of the second communication technology are known to the AR device. The distance between the AR device and the anchor device can be calculated according to the first propagation speed, the second propagation speed, time of the first spatial information packet be received, and time of the second spatial information packet be received. For example, the anchor device transmits the first spatial information packet through radio frequency (RF), and transmits the second spatial information packet through ultrasonic transmission. The first spatial information packet is received by the AR device at time T0. The second spatial information packet is received by the AR device at time T1. The propagation speed of RF (the first propagation speed) is approximately equal to the speed of light. The propagation speed of ultrasonic is slower, thus T1>T0. Time difference between receiving the first spatial information packet and the second spatial information packet is T1−T0. The distance between the AR device and the anchor device can be calculated according to the formula of distance=speed*time. The first propagation speed of the first communication technology is known. The second propagation speed of the second communication technology is known. The distance between the AR device and the anchor device can be calculated according to the first propagation speed, the second propagation speed, and the time difference between receiving the first spatial information packet and the second spatial information packet.

In step S106, the horizontal distance and the vertical height between the AR device and the anchor device can be calculated by the AR device according to the distance in step S105 and the angle between the transmitter and the horizontal plane.

Figure 3:
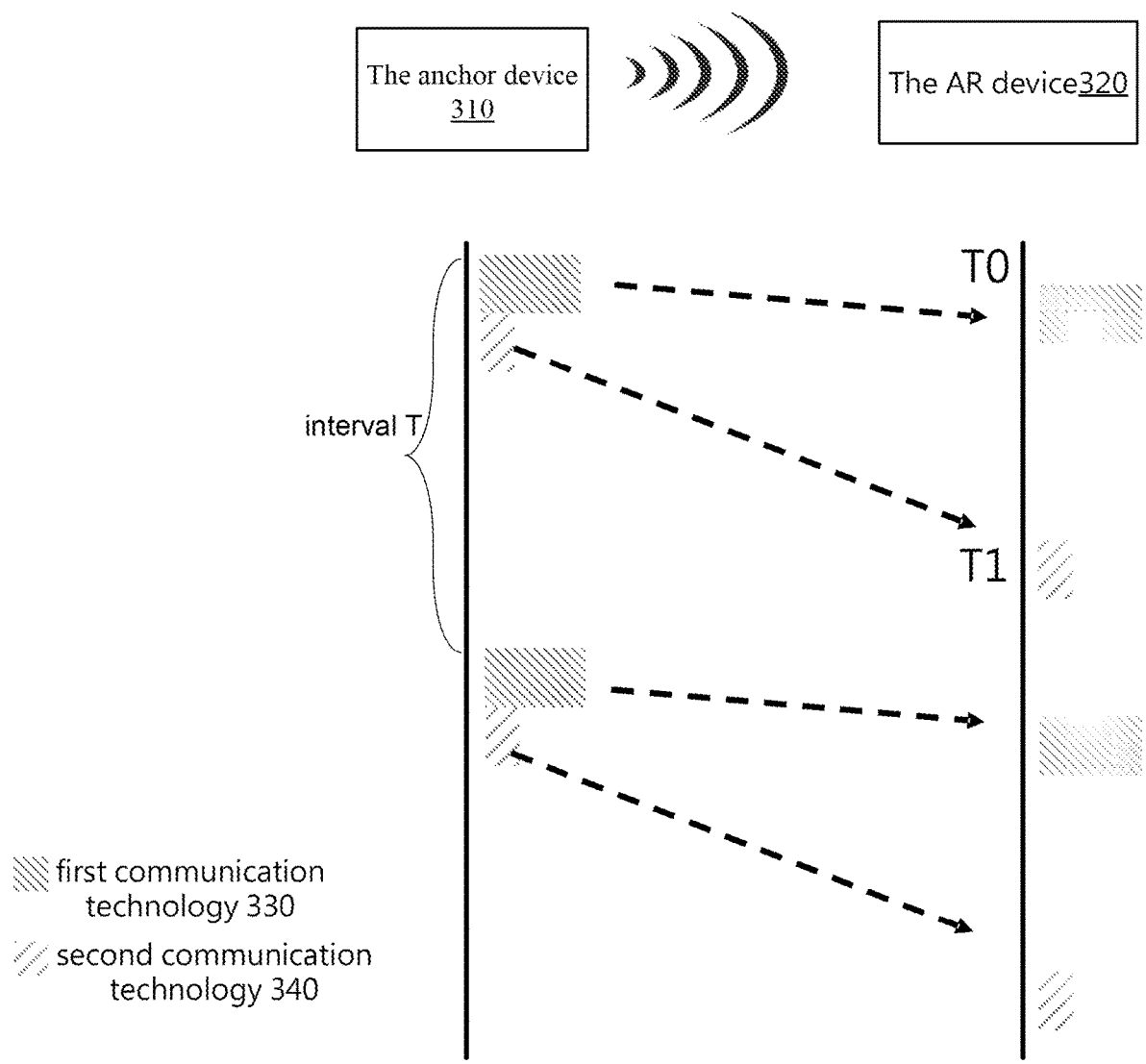
FIG. 3 is a diagram showing transmission of a spatial information packet according to an embodiment of the disclosure.

FIG. 3 is a diagram showing transmission of a spatial information packet according to an embodiment of the disclosure. As shown in FIG. 3, the anchor device 310 transmits the first spatial information packet through the first communication technology 330 and transmits the second spatial information packet through the second communication technology 340 every T time. In the embodiment, the first communication technology 330 is RF and the second communication technology 340 is ultrasonic beam, but transmission types are not limited to RF and ultrasonic. The propagation speed of RF is approximately equal to the speed of light $3\times10^8$ m/s, the propagation speed of ultrasonic in the air is 343 m/s. The AR device receives the first spatial information packet which is transmitted through RF at T0 and receives the second spatial information packet which is transmitted through ultrasonic at T1, therefore T1>T0. The distance between the AR device 302 and the anchor device 301 can be calculated according to the time difference T1−T0, the propagation speed of the first communication technology 330 and the propagation speed of the second communication technology 340.

Figure 4:
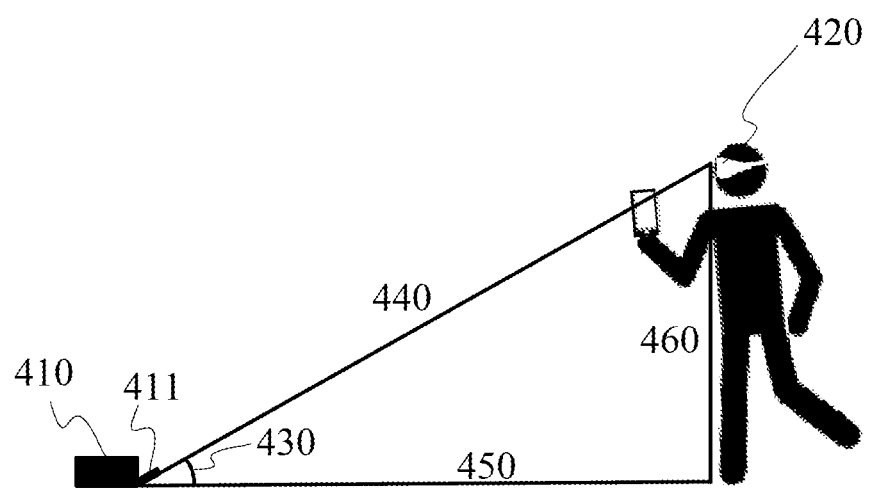
FIG. 4 is an application scenario diagram according to an embodiment of the disclosure.

FIG. 4 is an application scenario diagram according to an embodiment of the disclosure. As shown in FIG. 4, the anchor device 410 is on the around, the spatial information packets are transmitted through the first communication technology and the second communication technology by the transmitters. The transmitters are set to various angles. The AR device 420 receives the spatial information packet which is transmitted from the transmitter 411 when a user wearing the AR device 420 enters the application range of the anchor device 410. The angle 430 exists as an altitude angle between the horizontal plane and the transmitter 411. The anchor device 410 transmits spatial information packet with two kinds of communication technology at the same time. The spatial information packet includes the orientation of the transmitter 411 and the angle between the transmitter and the horizontal plane. The distance 440 between the anchor 410 and the AR device 420 can be calculated according to time difference between receipt of the transmissions through the first communication technology and the second communication technology, and thus the angle 430 between the horizontal plane and the transmitter 411. The horizontal distance 450 and the vertical height 460 between the anchor device 410 and the AR device 420 can be calculated according to the distance 440 and the angle 430. The spatial information packet includes the ID of the anchor device and the angle information. The AR device 420 can distinguish between the spatial information packet from individual anchor devices according to the ID of the anchor. The angle information includes the orientation of the transmitter 411 and the angle 430 between the transmitter and the horizontal plane.

Figure 5:
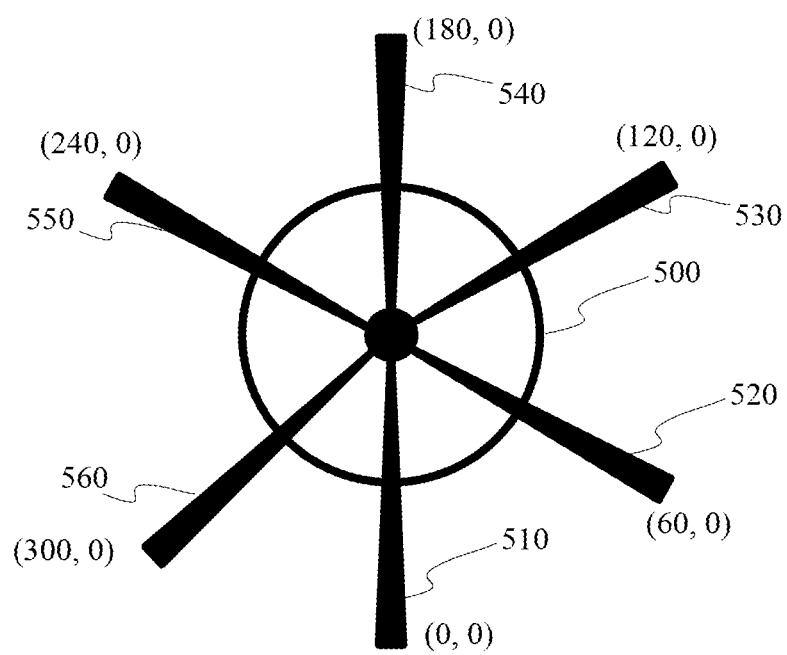
FIG. 5 is a top view of an anchor device according to an embodiment of the disclosure.

FIG. 5 is a top view of an anchor device according to an embodiment of the disclosure. As shown in FIG. 5, the anchor device 500 sets multiple transmitters with directional communication technology in different orientations. The AR device determines the relative position between the AR device and the anchor device 500 according to the orientation of the transmitter. The AR device receives the spatial information packet from a certain direction according to the characteristics of directional communication technology. As shown in FIG. 5, the AR device can only receive packets from a fourth transmitter 540 when the AR device is located at a 180-degree orientation relative to the anchor device. The spatial information packet of the fourth transmitter 540 includes information that the orientation is 180 degree relative to the anchor device and that the angle between the transmitter and the horizontal plane is 0 degree. However, the directional communication technology is limited by the direction, and the range of the single transmitter is limited. Thus the anchor device 500 needs multiple transmitters in order to cover all areas in the application space.

For example, as shown in FIG. 5, the effective range of each transmitter is 60 degrees. Users need to set at least six transmitters in different orientations to cover all application areas. A first transmitter 510 is set to the direction 0°, and the effective range is 330° to 30°. A second transmitter 520 is set to the direction 60°, and the effective range is 30° to 90°. A third transmitter 530 is set to the direction 120°, and the effective range is 90° to 150°. A fourth transmitter 540 is set to the direction 180°, and the effective range is 150° to 210°. A fifth transmitter 550 is set to the direction 240°, and the effective range is 210° to 270°. A sixth transmitter 560 is set to the direction 300°, and the effective range is 270° to 330°. The AR device can receive any spatial information packet which is transmitted from the anchor device, no matter where the AR device is located relative to the anchor device 500. The AR device can determine where the anchor device 500 is located according to the angle information in the spatial information packet.

Figure 6:
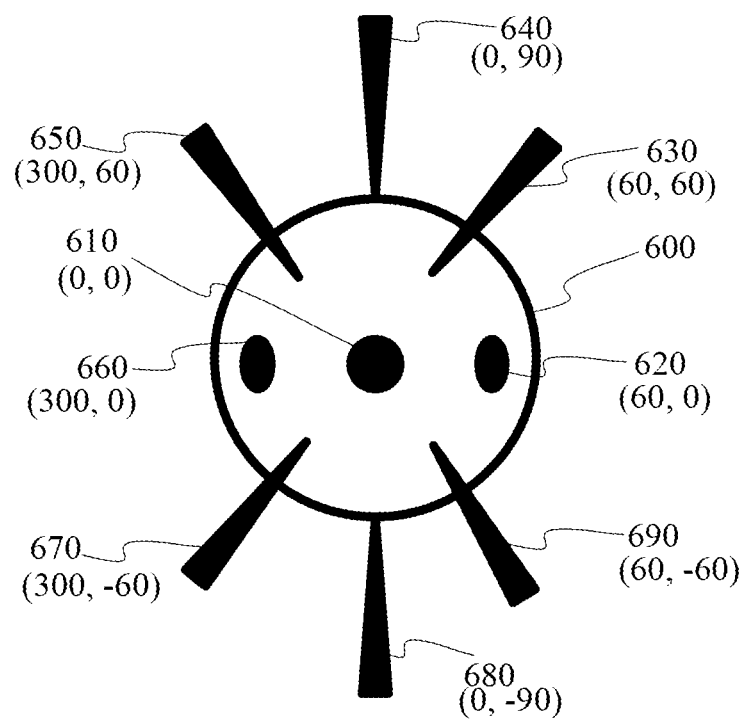
FIG. 6 is a side view of an anchor device according to an embodiment of the disclosure.

FIG. 6 is a side view of an anchor device according to an embodiment of the disclosure. In the different embodiment, the type of the anchor device 600 can be selected depending on the application environment. The anchor device 600 can be spherical or hemispherical but is not limited. For example, shape of the anchor device 600 is spherical. As shown in FIG. 6 the anchor device 600 sets multiple transmitters in different orientations. A first transmitter 610 is set to the direction 0° and the angle between the transmitter and the horizontal plane is 0°. A second transmitter 620 is set to the direction 60° and the angle between the transmitter and the horizontal plane is 0°. A third transmitter 630 is set to the direction 60° and the angle between the transmitter and the horizontal plane is 60°. A fourth transmitter 640 is set to the direction 0° and the angle between the transmitter and the horizontal plane is 90°. A fifth transmitter 650 is set to the direction 300° and the angle between the transmitter and the horizontal plane is 60°. A sixth transmitter 660 is set to the direction 300° and the angle between the transmitter and the horizontal plane is 60°. A seventh transmitter 670 is set to the direction 300° and the angle between the transmitter and the horizontal plane is −60°. An eighth transmitter 680 is set to the direction 0° and the angle between the transmitter and the horizontal plane is −90°. A ninth transmitter 690 is set to the direction 60° and the angle between the transmitter and the horizontal plane is −60°.

Figure 7:
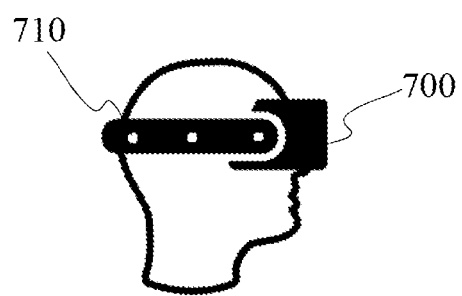
FIG. 7 is a diagram of an augmented reality device according to an embodiment of the disclosure.

FIG. 7 is a diagram of an AR device according to an embodiment of the disclosure. As shown in FIG. 7, directional communication technology is used to identify the locational relationship between the anchor device and the AR device 700. Thus, there are multiple receivers set on the AR device 700. The white spots shown in FIG. 7 show the positions where multiple receivers may be set. However, the configuration in FIG. 7 is only to express that the AR device 700 needs to have receivers 710 in various positions. Thus, the AR device 700 can receive spatial information packet from various directions. The AR device can be any form of device such as head-mounted devices, smart glasses, smart phones, tablets, etc.

The embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for establishing anchors in augmented reality, comprising:
    transmitting a first spatial information packet and a second spatial information packet continuously by an anchor device, wherein the anchor device further comprises a transmitter;
    transmitting the first spatial information packet through a first communication technology and transmitting the second spatial information packet through a second communication technology, wherein the first spatial information packet and the second spatial information packet comprise a identification (ID) of the anchor device and angle information;
    receiving the first spatial information packet and the second spatial information packet by a augmented reality (AR) device, wherein the AR device further comprise a processing unit;
    obtaining a spatial relationship between the AR device and the anchor according to the first spatial information packet and the second spatial information packet by the processing unit, the spatial relationship between the AR device and the anchor includes a orientation, a horizontal distance, and a vertical height.

2. The method for establishing an anchor in augmented reality as claimed in claim 1, wherein the first communication technology and the second communication technology comprise radio frequency (RF), ultrasonic, infrared, and laser.

3. The method for obtaining wire information as claimed in claim 1, wherein the angle information includes of direction of the transmitter pointed in horizontal position, and an angle between the transmitter and a horizontal plane.

4. The method for establishing an anchor in augmented reality as claimed in claim 1, wherein
    a distance between the AR device and the anchor can be calculated by the processing unit according to a transmitting speed of the first communication technology, a transmitting speed of the second communication technology, time of receiving the first spatial information packet and time of receiving the second spatial information packet;
    the horizontal distance and the vertical height between the AR device and the anchor can be calculated according to the distance and the angle information.

5. A system for establishing anchors in augmented reality, comprising:
    an anchor device transmits a first spatial information packet and a second spatial information packet continuously;
    the anchor device includes a transmitter which transmits the first spatial information packet through a first communication technology and transmits the second spatial information packet through a second communication technology;
    the first spatial information packet and the second spatial information packet include a identification (ID) of the anchor device and angle information;
    an augmented reality (AR) device receives the first spatial information packet and the second spatial information packet, wherein the AR device further comprises a processing unit;
    the processing unit obtains a spatial relationship between the AR device and the anchor according to the first spatial information packet and the second spatial information packet, the spatial relationship between the AR device and the anchor includes a orientation, a horizontal distance, and a vertical height.

6. The system for establishing an anchor in augmented reality as claimed in claim 5, wherein the first communication technology and the second communication technology comprise radio frequency (RF), ultrasonic, infrared and laser.

7. The system for establishing an anchor in augmented reality as claimed in claim 5, wherein the angle information includes of direction of the transmitter pointed in horizontal position, and an angle between the transmitter and a horizontal plane.

8. The system for establishing an anchor in augmented reality as claimed in claim 5, wherein
    a distance between the AR device and the anchor can be calculated by the processing unit according to a transmitting speed of the first communication technology, a transmitting speed of the second communication technology, time of receiving the first spatial information packet and time of receiving the second spatial information packet;

the horizontal distance and the vertical height between the AR device and the anchor can be calculated according to the distance and the angle information.

* * * * *